(12) United States Patent
Steindl

(10) Patent No.: US 7,760,724 B2
(45) Date of Patent: Jul. 20, 2010

(54) METHOD FOR STAMPING ANY ETHERNET FRAMES IN CONJUNCTION WITH STANDARD ETHERNET

(75) Inventor: Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 251 days.

(21) Appl. No.: 11/660,636

(22) PCT Filed: Jul. 14, 2006

(86) PCT No.: PCT/EP2006/064257

§ 371 (c)(1),
(2), (4) Date: Oct. 25, 2007

(87) PCT Pub. No.: WO2007/017340

PCT Pub. Date: Feb. 15, 2007

(65) Prior Publication Data

US 2008/0117936 A1    May 22, 2008

(30) Foreign Application Priority Data

Aug. 8, 2005    (DE) .................. 10 2005 037 376

(51) Int. Cl.
*H04L 12/28* (2006.01)

(52) U.S. Cl. ............... 370/389; 370/401; 370/410; 370/443; 370/446; 370/448

(58) Field of Classification Search ........... 370/389, 370/401, 410, 443, 444, 445, 446, 447, 448
See application file for complete search history.

(56) References Cited

U.S. PATENT DOCUMENTS

| | | | | |
|---|---|---|---|---|
| 5,128,945 | A * | 7/1992 | Enns et al. | 714/776 |
| 5,511,166 | A * | 4/1996 | Travaglio et al. | 709/250 |
| 5,784,559 | A * | 7/1998 | Frazier et al. | 370/522 |
| 6,393,482 | B1 * | 5/2002 | Rai et al. | 709/225 |
| 6,421,730 | B1 * | 7/2002 | Narad et al. | 709/236 |
| 6,717,956 | B1 | 4/2004 | Fan et al. | |
| 7,590,151 | B2 * | 9/2009 | Middleton et al. | 370/516 |
| 2002/0039370 | A1 * | 4/2002 | Elliot | 370/503 |
| 2003/0103521 | A1 * | 6/2003 | Raphaeli et al. | 370/445 |
| 2003/0115369 | A1 | 6/2003 | Walter et al. | |
| 2003/0214982 | A1 * | 11/2003 | Lorek et al. | 370/537 |
| 2004/0213272 | A1 * | 10/2004 | Nishi et al. | 370/401 |
| 2004/0218542 | A1 * | 11/2004 | Lee | 370/248 |
| 2005/0099949 | A1 * | 5/2005 | Mohan et al. | 370/236.2 |
| 2007/0263631 | A1 * | 11/2007 | Mallory | 370/394 |

FOREIGN PATENT DOCUMENTS

EP    1 104 962 A2    6/2001

\* cited by examiner

*Primary Examiner*—Salman Ahmed
*Assistant Examiner*—Andrew C Lee

(57) ABSTRACT

There is provided a method and apparatus for stamping any Ethernet frames. Any Ethernet frame is provided with a time stamp, it being possible to use standard Ethernet controllers defined according to IEEE 802.X. This is achieved by the method in such a way that the stamp is applied between an Ethernet controller operated in RAW mode and a "Physical Layer" to an area of the Media Access Control (MAC) destination address, while the original MAC destination address is advantageously encoded in the remaining area.

12 Claims, 2 Drawing Sheets

| | |
|---|---|
| Präambel | 7 Byte |
| Start Frame Delimiter (SFD) | 1 Byte |
| MAC-Zieladresse | 6 Byte |
| MAC-Quelladresse | 6 Byte |
| VLAN (optional) | |
| Frame-Länge/Typ | 2 Byte |
| Daten | max. 1500 Byte |
| Frame Check Sequence (FCS) | 4 Byte |

2 — Beliebiger Ethernet-Controller (z.B. TriCore, Net-Arm, ...)

1 — Vorrichtung zur Stempelung

3 — Beliebiger Physical Layer (z.B. Intel, AMD, ...)

| | |
|---|---|
| *Präambel* | *7 Byte* |
| *Start Frame Delimiter (SFD)* | *1 Byte* |
| MAC-Zieladresse | 6 Byte |
| MAC-Quelladresse | 6 Byte |
| VLAN (optional) | |
| Frame-Länge/Typ | 2 Byte |
| Daten | max. 1500 Byte |
| Frame Check Sequence (FCS) | 4 Byte |

METHOD FOR STAMPING ANY ETHERNET FRAMES IN CONJUNCTION WITH STANDARD ETHERNET

CROSS REFERENCE TO RELATED APPLICATIONS

This application is the US National Stage of International Application No. PCT/EP2006/064257, filed Jul. 14, 2006 and claims the benefit thereof. The International Application claims the benefits of German application No. 10 2005 037 376.3 DE filed Aug. 8, 2005, both of the applications are incorporated by reference herein in their entirety.

FIELD OF INVENTION

The invention relates to a method and a device for applying a stamp to any Ethernet frames in conjunction with a standard Ethernet controller.

BACKGROUND OF INVENTION

A method or apparatus of this kind is used in local area networks, particularly in distributed systems in automation for which a precise time base is important. Automation systems are here to be understood as systems which use technical means to carry out particular operations partly or wholly according to predefined programs without human intervention. In this context, the term operations denotes e.g. manufacturing processes, assembly processes, transportation processes, quality control processes, etc. which take place particularly in an industrial environment.

Highly accurate Ethernet synchronization e.g. by means of the Precision Time Protocol (PTP) specified in IEEE 1588 requires time stamping of the Ethernet telegrams at the time of reception. Increasing the telegram length in order to add the stamp is not supported by the Media Access Controllers (MACs).

The known solutions apply the time stamp as a prefix or postfix to the Ethernet frame, which means that standard Ethernet controllers can no longer be used. This problem is solved in a proprietary manner by additional hardware which is generally connected to the Media Independent Interface (MII) between an Ethernet controller and a "Physical Layer" (PHY).

US 2003/0115369 A1 discloses a method wherein, by means of an "epoch packet" which marks the start of a frame having a plurality of time slots, a plurality of devices connected to a network are assigned said time slots together with an offset and the duration of the relevant time slot during which packets may be transmitted onto the network. The epoch packets themselves are e.g. standard Ethernet frames, the time slot information constituting to some extent the application data of the Ethernet frame. The actual time stamping for synchronization is performed here by a governor which provides the incoming epoch packets in a bus adapter of the relevant device with a time stamp after the media access controller incorporated in the adapter has removed the headers of the Ethernet frames.

SUMMARY OF INVENTION

An object of the invention is to provide any Ethernet frames with a stamp, in particular a time stamp, it being possible to use standard Ethernet controllers defined by the general Ethernet standard IEEE 802.X.

This object is achieved by a method for applying a stamp to any Ethernet frames in conjunction with a standard Ethernet controller, said Ethernet controller being operated in so-called RAW mode in which e.g. no media access control (MAC) destination address filtering is performed, and the stamp is entered in an area of the MAC destination address of the Ethernet frame.

This object is further achieved by an apparatus for applying a stamp to any Ethernet frames in conjunction with a standard Ethernet controller, said apparatus being provided between an Ethernet controller operated in so-called RAW mode in which e.g. no media access control (MAC) destination address filtering is performed, and a "Physical Layer" (PHY), and incorporates means of entering the stamp in an area of the MAC destination address of the Ethernet frame.

Every Ethernet controller supports the so-called RAW mode in which checking of the Ethernet telegram is reduced to a minimum. If the Ethernet controller is operated in this mode and checking of the MAC destination address is shifted to the apparatus for stamping any Ethernet frames, the 6-byte MAC destination address is available for stamping. By means of the selected location of the apparatus between Ethernet controller and PHY, the apparatus can manipulate the data flow between Ethernet controller and PHY as required.

In a particularly advantageous embodiment, four bytes of the six-byte MAC destination address are provided for the stamp, while the remaining two bytes encode the original MAC destination address, which means that the full functionality of the MAC destination address, such as a plurality of unicast addresses or additional multicast addresses, is retained, as the stamp can be extracted by software at each Ethernet controller and the Ethernet frame can be re-provided with the original MAC destination address.

In a likewise advantageous embodiment, the apparatus and also the PHY can be controlled via reading and writing by the Serial Management Interface (SMI) protocol of the Media Independent Interface (MII) specified in the general Ethernet standard IEEE 802.X, by means of which a 32x32x2 byte address space is read and write addressable, and for its control e.g. the (28-31)xYYx2 byte address space is provided, which means that another 28 PHYs [(0-27)xYYx2 bytes] remain selectable.

The apparatus advantageously has means of entering the time stamp for the Precision Time Protocol (PTP) specified in IEEE 1588. This functionality is available on every conceivable Ethernet controller with SMI.

Multicast telegrams are provided in many Ethernet protocols, the apparatus advantageously being usable as a pre-filter for load reduction at the local interface.

BRIEF DESCRIPTION OF THE DRAWINGS

The invention will now be described and explained in greater detail with reference to the accompanying drawings, in which.

DETAILED DESCRIPTION OF INVENTION

Figures 1, 2:
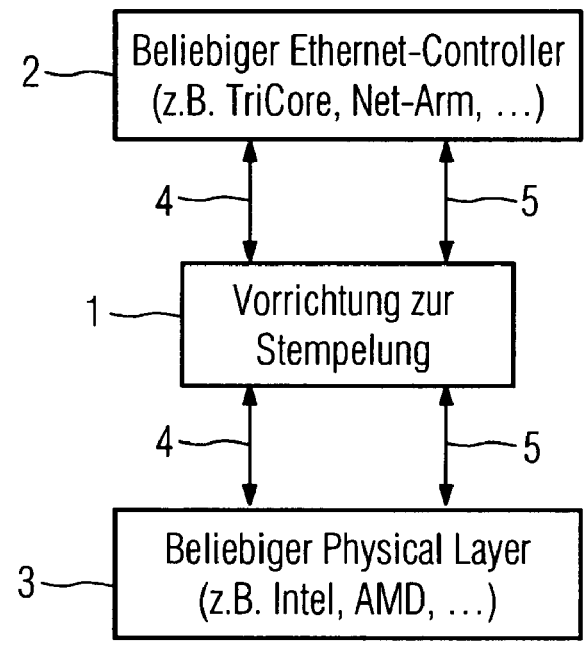
FIG. 1 shows the apparatus for stamping any Ethernet frames between Ethernet controller and Physical Layer.
FIG. 2 shows an Ethernet frame defined according to the general Ethernet standard IEEE 802.X.

FIG. 1 shows an apparatus for stamping 1 any Ethernet frames between any Ethernet controller 2 (e.g. TriCore or NET+ARM) and any Physical Layer 3 (e.g. Intel or AMD).

Every Ethernet controller supports the Media Independent Interface (MII) 5 specified in the general Ethernet standard IEEE 802.X, with its Serial Management Interface (SMI) 4. The apparatus for stamping 1 is controlled like the Physical Layer 3 via reading and writing by the SMI protocol.

FIG. 2 shows an Ethernet frame defined according to the general Ethernet standard IEEE 802.X, the preamble field, as the name suggests, not being part of the actual Ethernet frame, likewise the subsequent Start Frame Delimiter (SFD) which marks the start of the actual Ethernet frame with the sequence 10101011. The frame begins with the Media Access Control (MAC) destination address described in the method according to the invention and the subsequent MAC source address. The length of the optional VLAN field varies according to the standard and e.g. in IEEE standard 802.1Q comprises 4 bytes. The actual data field has a minimum length of 46 bytes and is followed by the Frame Check Sequence (FCS) which ends the Ethernet frame. It contains a value calculated by means of a cyclic redundancy check.

Due to the selected location on the MII, the described method and apparatus are independent of the physical transmission type, glass fiber or copper, and of the transmission speed, 10 MBd to 10 GBd, as in all operating modes a MII or GMII is defined in the general Ethernet standard IEEE 802.X.

Figure 3:
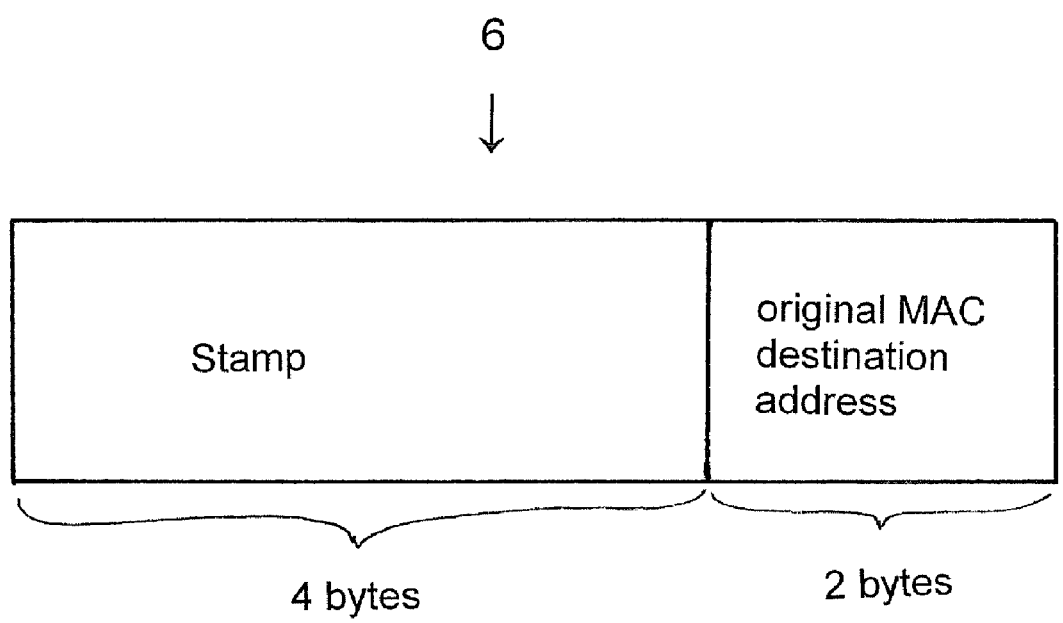
FIG. 3 shows a MAC destination address including the stamp.

FIG. 3 shows a MAC destination address 6, wherein four bytes of the six-byte MAC destination address are provided for the stamp, while the remaining two bytes encode the original MAC destination address.

The embodiments described have further advantages in terms of the simple hardware integration, low costs and large number of possible uses.

To summarize, the invention relates to a method and apparatus for stamping any Ethernet frames. The object of the invention is to provide any Ethernet frames with in particular a time stamp, it being possible to use standard Ethernet controllers defined according to IEEE 802.X. This object is achieved by a novel method in such a way that the stamp is applied between an Ethernet controller operated in RAW mode and a "Physical Layer" to an area of the Media Access Control (MAC) destination address, while the original MAC destination address is advantageously encoded in the remaining area.

The invention claimed is:

1. A method for applying a stamp to an Ethernet frame, comprising steps of:
    processing by an Ethernet controller in a RAW mode whereby no MAC destination address filtering is performed; and
    entering the stamp in the MAC destination address of the Ethernet frame,
    wherein the MAC destination address has six bytes, four bytes of the six-byte MAC destination address are provided for the stamp and remaining two bytes encode the original MAC destination address, and wherein the stamp indicates a time of reception of an Ethernet telegram.

2. The method as claimed in claim 1, wherein a checking of the MAC destination address and the stamping of the Ethernet frames is performed in an additional apparatus which is provided between the Ethernet controller and a Physical Layer.

3. The method as claimed in claim 2, wherein the additional apparatus is controlled similar to Physical Layer via reading and writing by a Serial Management Interface protocol of a Media Independent Interface specified in a general Ethernet standard IEEE 802.X.

4. The method as claimed in claim 1, wherein the stamp is a time stamp.

5. An apparatus for applying a stamp to an Ethernet frame, comprising:
    providing the apparatus between a Physical layer and an Ethernet controller operated in a RAW mode such that no MAC destination address filtering is performed; and
    a device for entering the stamp in an area of the MAC destination address,
    wherein four bytes of a six-byte MAC destination address are provided for the stamp and remaining two bytes encode the original MAC destination address, and
    wherein the stamp indicates a time of reception of an Ethernet telegram.

6. The apparatus as claimed in claim 5, wherein the apparatus is controlled like the Physical Layer via reading and writing by a Serial Management Interface protocol of a Media Independent Interface specified in a general Ethernet standard IEEE 802.X.

7. The apparatus as claimed in claim 6, wherein the time stamp is based upon a Precision Time Protocol specified in IEEE 1588.

8. The apparatus as claimed in claim 6, wherein the apparatus is used as a pre-filter for load reduction at a local interface, when using an Ethernet protocol in which multicast telegrams are provided.

9. The apparatus as claimed in claim 5, wherein the stamp is a time stamp.

10. A system for applying a stamp to an Ethernet frame, comprising:
    an Ethernet controller, operated in a RAW mode such that no MAC destination address filtering is performed and a Physical Layer;
    an apparatus for applying a stamp to an Ethernet frame and provided between the Ethernet controller and the Physical Layer; and
    an area for a MAC destination address having the stamp entered,
    wherein four bytes of a six-byte MAC destination address are provided for the stamp and remaining two bytes encode the original MAC destination address, and
    wherein the stamp indicates a time of reception of an Ethernet telegram.

11. The system as claimed in claim 10, wherein the system has a plurality of Ethernet controllers.

12. The system as claimed in claim 10, wherein the system has a plurality of Physical Layers.

* * * * *